UNITED STATES PATENT OFFICE.

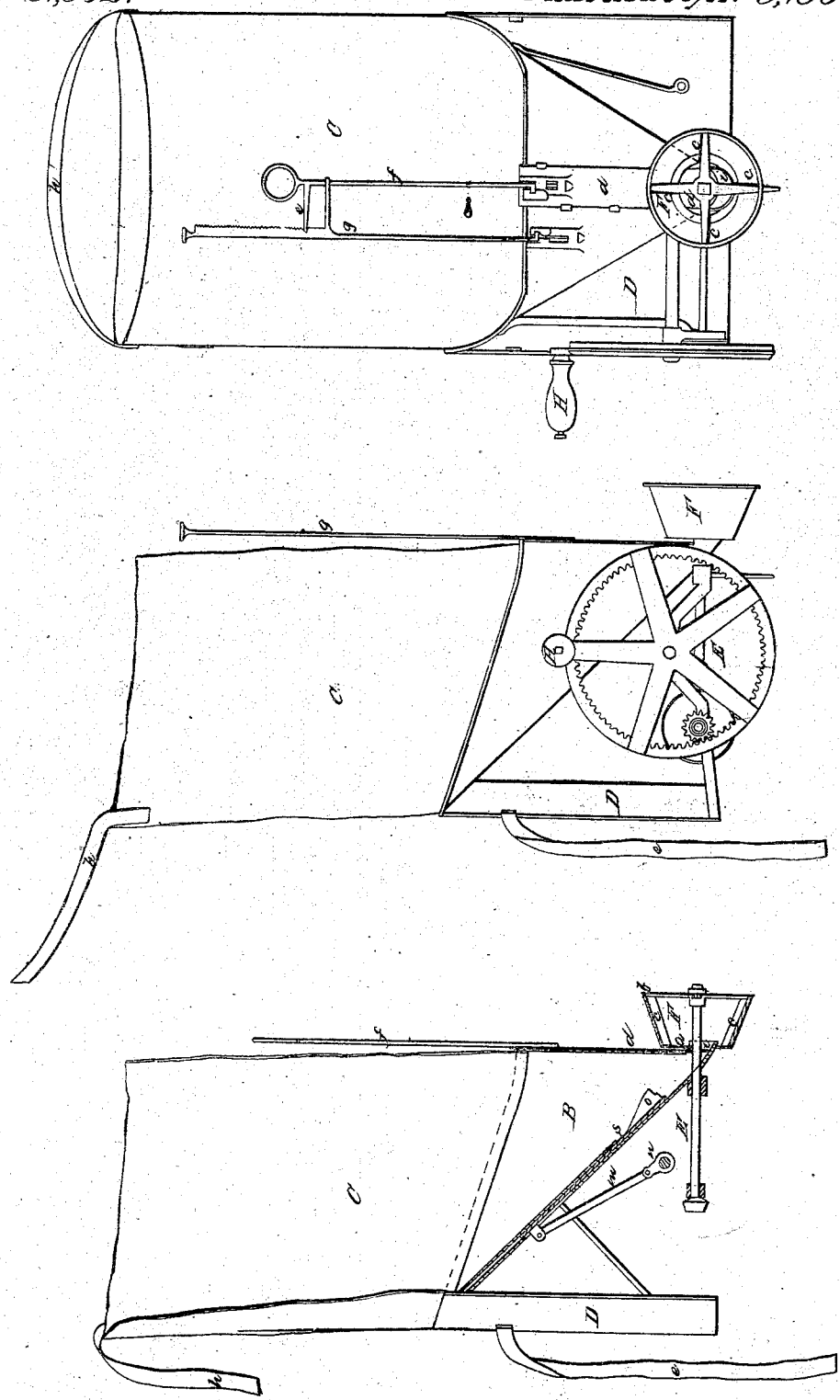

C. W. CAHOON, OF PORTLAND, MAINE.

SEEDING-MACHINE.

Specification of Letters Patent No. 31,952, dated April 9, 1861.

*To all whom it may concern:*

Be it known that I, CHARLES W. CAHOON, of Portland, in the county of Cumberland and State of Maine, have invented a new and useful Improvement in Seed-Sowers, and that the following is a full, clear, and exact description of the same, reference being had to the accompanying drawing, in which—

Figure 1 represents a side elevation of a broadcast seed sower constructed according to the principles of my invention, Fig. 2 represents a front elevation of the same, and Fig. 3 a vertical section thereof through the center of the centrifugal seed discharger.

In all these figures the hopper of the machine is represented as distended with seed.

My invention has reference to centrifugal seed sowers which are supported upon the body of the operator and operated by hand, and the objects of my invention are to enable such a machine to be sustained firmly upon the body of the operator who carries and operates it, and to enable it to be made of light weight and in such manner that it adapts itself to the form of the operator.

The first part of my invention has reference to the first object, and consists in combining the hopper of a seed sower, the centrifugal seed discharger thereof, and their appurtenances, with a breast plate which fits against and is secured to the body of the operator; and the second part of my invention consists in combining a centrifugal seed discharger with a flexible reservoir of seed, or bag hopper, by means of a conductor which conducts the seed from the hopper into the seed discharger.

Both parts of my invention are represented in the accompanying drawing as embodied in a seed sowing machine for discharging seed broadcast in planes of discharge that are vertical or thereabout, upon the principle of the centrifugal seed sowing machine patented to me the first day of September, 1857. The seed discharger or revolving head F as in that machine is mounted upon a shaft E, that is horizontal or thereabout, and extends in the direction in which the machine is carried forward over the ground to be sowed; this shaft is arranged to revolve in suitable bearings which are connected rigidly with and supported by a breast plate D. The latter is curved to fit the body and is fitted with strings or straps $e\ e$ by which it can be secured to the person. The seed discharger in the present example is of circular form, it has an eye $a$ at the side nearer the operator into which the seed to be sowed is fed, and a periphery $b$, or place of discharge, of greater diameter than the eye from which the seed is discharged; its interior is also fitted with flanges $c$, or plates of metal, to assist in imparting sufficient centrifugal force to the seed.

The shaft of the seed distributer is surmounted by a bag hopper C, or reservoir of seed. This hopper is formed in the present example of canvas, and is of sufficient capacity to contain as much seed as an operator can carry with ease, say half a bushel; the lower end of the bag is connected with a funnel shaped conductor B, which terminates in a spout $i$ that delivers the seed into the eye of the centrifugal discharger. As the hopper is upright while the axis of the seed discharger is horizontal or thereabout, the form of the conductor is such that it receives the grain as it moves downward from the hopper, changes the direction of its movement, and delivers it by the spout into the eye of the seed discharger. The spout is fitted with a sliding gate $d$ to regulate the discharge of seed, and the gate is fitted with a rod handle $f$ which projects upward beside a gage rod $g$. The gate handle has an index $e$ which slides upon the gage bar, and the latter has notches in one of its edges to enable the operator to regulate the distance to which the gate is raised. The hopper is fitted with a neck strap $h$ by which it is sustained in an upright position upon the chest of the operator.

In order to distribute seed efficiently by centrifugal force the periphery of the seed discharger, or place from which the seed is discharged, must be caused to move with the requisite speed to cast the seed from the machine to the desired distance. If the discharger be made of small diameter, as it is in the machine represented in the drawing, this speed must be obtained by causing it to revolve rapidly; and as in such cases it is difficult to move the hand fast enough for this purpose, the requisite speed of revolution is obtained in the example represented in the drawings by means of cog wheel gearing, to the last wheel of which a crank handle F is secured. The same result may however be accomplished by making the seed discharger of increased diameter, so that a slower speed of revolution will cause the place of discharge to move with the requisite speed.

When this machine is to be operated, the head of the operator is inserted through the neck strap *h*, so that the machine lies against his chest and the neck strap hangs from his neck; in this position the flexibility of the bag hopper permits it to adapt itself to his form, so that the weight is borne without inconvenience. The strings of the breast plate are then tied behind his body, so as to secure the machine in its position. The bag hopper is filled with seed and the operator applies his right hand to the crank handle F and his left to the gate handle *f*. As he walks forward he turns the crank and thus imparts the requisite rotation to the seed distributer, while with his left hand he regulates the position of the gate and permits seed to pass out the seed spout at the rate required to sow the ground more or less thickly as desired. When the gate is set to the proper gage, the operator may apply his left hand to the brace which connects the breast plate with the conductor on the left side of the machine, and which thus forms a convenient handle by which he can steady it while turning the crank. In order to insure a regular flow of seed into the discharger the conductor is fitted with an agitator, consisting of a pair of teeth *o* to which a reciprocating movement is imparted by a crank *n* secured to the shaft of the main wheel of the gearing, and a connecting rod *m*, that connects the pin of the crank with the stock *s* of the agitator.

Having thus described a machine that embodies my invention it is proper to state that the invention is not confined to a centrifugal seed distributer of any peculiar form so long as it is constructed and operated in such manner that the seed enters it nearer its axis of rotation than that part of it from which the seed is discharged; thus for example the seed discharger may have the form of a series of tubes diverging from a central hub at which the seed enters the tubes, or of a series of gutters or seed channels diverging from a common axis of rotation, or of a hollow flat hub with radiating partitions: nor is the invention limited to the revolution of the discharger upon a shaft that is exactly horizontal. Moreover the invention is not confined to a conductor of any peculiar material, although I have found that thin sheet metal is the most suitable material for this purpose: nor is it limited to a seed distributer of such small diameter that gearing is required to enable the operator to cause its place of discharge to move with sufficient speed to cast the seed the desired distance.

I do not claim in this patent any one of the parts, which constitute my combinations, separately or detached from its combination with the other parts, but—

What I claim as my invention and desire to secure by Letters Patent is—

1. The combination of a hopper, centrifugal seed discharger, and their appurtenances, with a breast plate, substantially as herein set forth.

2. The combination of a centrifugal seed discharger with a bag hopper by means of a conductor that receives the seed from the bag and conducts it to the seed discharger, substantially as herein set forth.

In testimony whereof I have hereunto subscribed my name.

CHARLES W. CAHOON.

Witnesses:
JAMES DOUGHTY,
CLINTON FURLISH.